C. W. DAVIS.
HAY STACKER.
APPLICATION FILED JAN. 2, 1908.

914,388.

Patented Mar. 9, 1909.
3 SHEETS—SHEET 1.

WITNESSES

INVENTOR
CURTIS W. DAVIS
BY
HIS ATTORNEYS

C. W. DAVIS.
HAY STACKER.
APPLICATION FILED JAN. 2, 1908.

914,388.

Patented Mar. 9, 1909.
3 SHEETS—SHEET 2.

WITNESSES

INVENTOR
CURTIS W. DAVIS
BY
HIS ATTORNEYS

C. W. DAVIS.
HAY STACKER.
APPLICATION FILED JAN. 2, 1908.
914,388.
Patented Mar. 9, 1909.
3 SHEETS—SHEET 3.
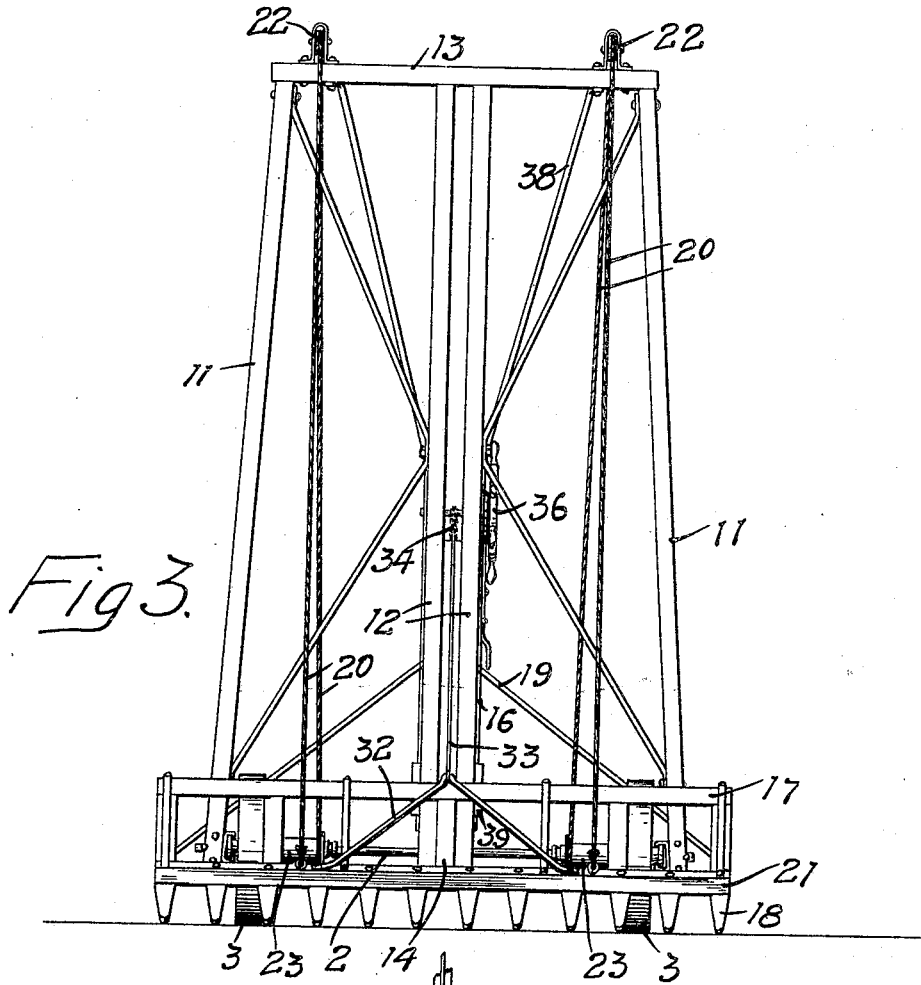
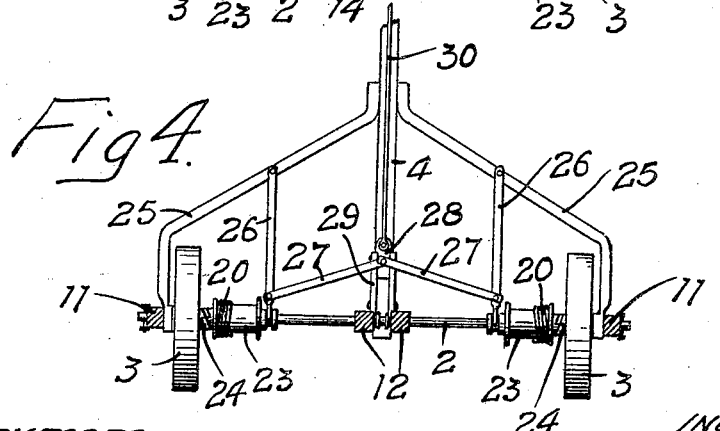
WITNESSES
INVENTOR
CURTIS W. DAVIS
BY
HIS ATTORNEYS

UNITED STATES PATENT OFFICE.

CURTIS W. DAVIS, OF DONALDSON, MINNESOTA.

HAY-STACKER.

No. 914,388.　　Specification of Letters Patent.　　Patented March 9, 1909.

Application filed January 2, 1908. Serial No. 409,062.

*To all whom it may concern:*

Be it known that I, CURTIS W. DAVIS, of Donaldson, Kittson county, Minnesota, have invented certain new and useful Improvements in Hay-Stackers, of which the following is a specification.

My invention relates to machines for transporting hay from different parts of the field to a stack.
The object of my invention is to provide a machine of comparatively few parts, easily operated and very efficient for the purpose designed.

The invention consists generally in various constructions and combinations, all as hereinafter described and particularly pointed out in the claims.

Figure 1:
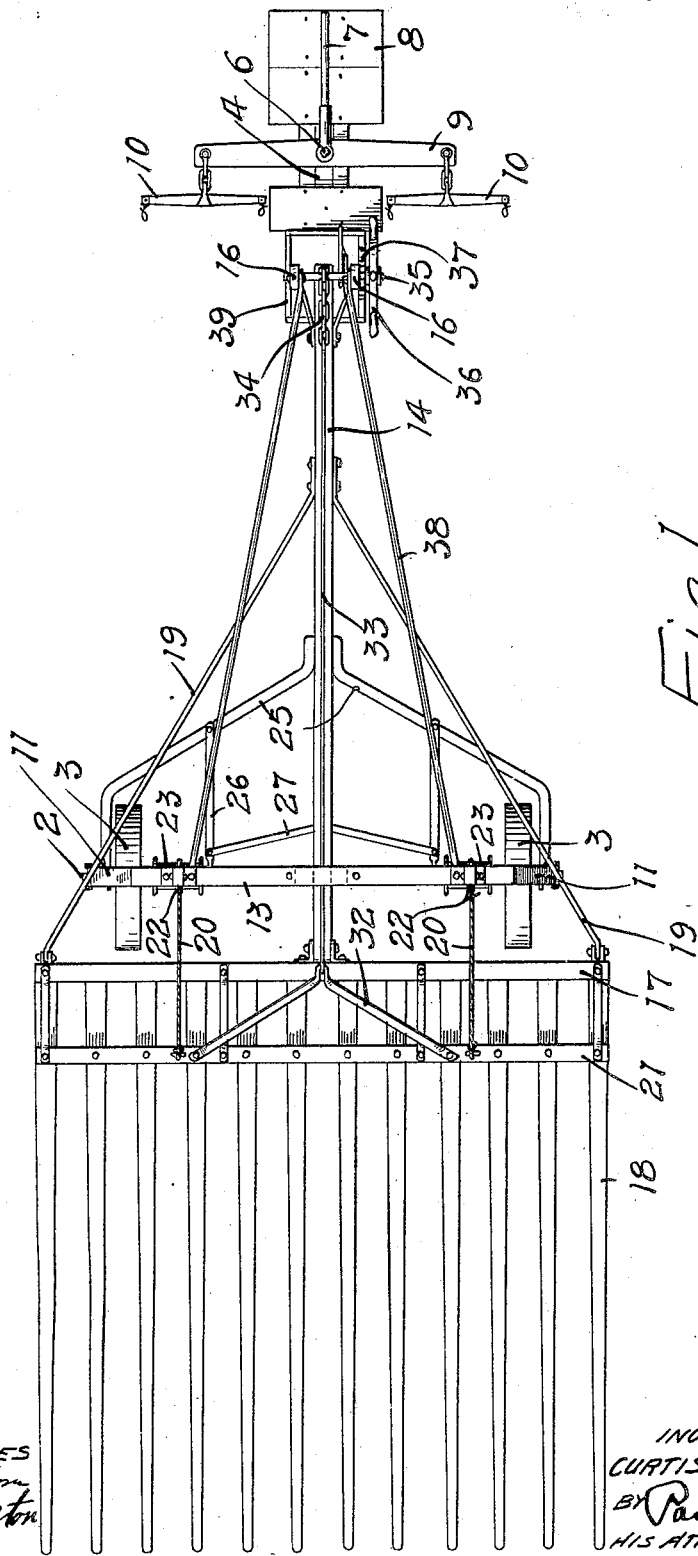
Figure 2:
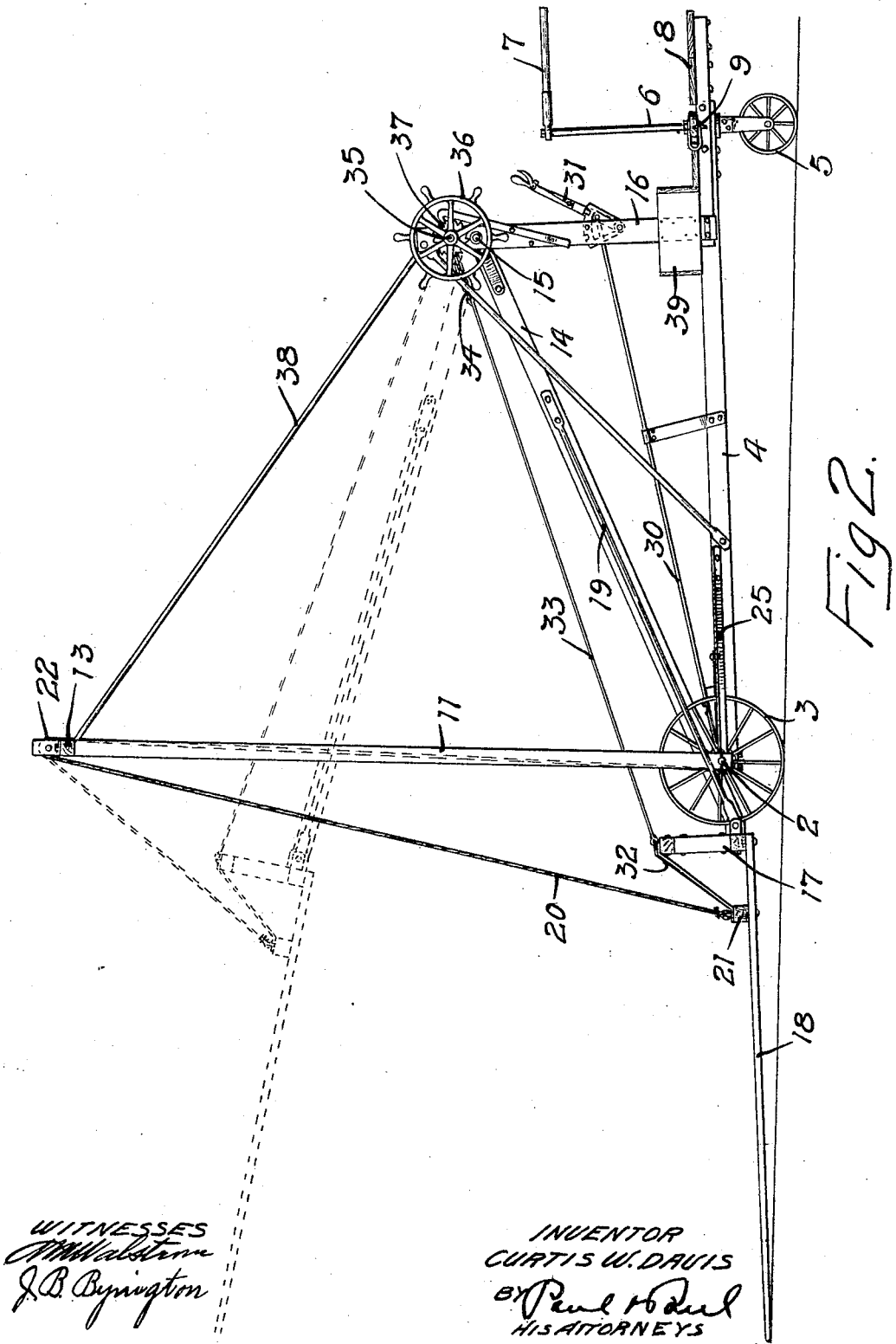

In the accompanying drawings forming part of this specification, Figure 1 is a plan view of a stacker embodying my invention. Fig. 2 is a side elevation of the same. Fig. 3 is a front elevation. Fig. 4 is a sectional view illustrating in detail the mechanism for lifting the fork from the axle.
In the drawing, 2 represents an axle having carrying wheels 3.

4 is a frame extending rearwardly from the middle portion of the axle and supported at the rear end by a wheel 5 which has a post 6 journaled in said frame and an operating handle 7 by means of which a person in charge of the machine, standing on the platform 8, may guide it across the field. An evener 9 is mounted on the frame in front of said platform to which swingletrees 10 are attached on each side of the machine. These swingletrees are capable of adjustment on either side of the evener so that the team may be driven ahead or swung around to the other side of the evener to draw the machine backward.

Mounted on the axle 2 are side standards 11 at each end of the axle and a pair of middle standards 12 upwardly from the middle portion of the axle. These standards are connected with the top of the machine by a cross bar 13. Between the middle standards 12 a beam 14, pivoted at 15 between standards 16 on the frame 4, is adapted to slide.
A fork head 17 is pivoted on the forward end of the beam 14 and is provided with a series of forwardly projecting tines or teeth 18 whose extreme forward ends are adapted to rest upon the ground. Braces 19 connect the said head with the beam 14 and brace the fork against oscillation. Cables 20 are attached to a cross-bar 21 extending transversely of the tines 18 near the head 17, and extend up over sheaves 22 on the cross-bar 13 and from thence to drums 23 provided on the axle 2 on each side of the center. These drums have clutch connections 24 with the carrying wheels and are adapted to slide on the axle toward and from the heads of said wheels for the purpose of rendering the clutch devices operative or inoperative. Braces 25 connect the ends of the axle with the frame, and bars 26 are pivoted on said braces and have their forward ends loosely connected with the drums 23. Toggle links 27 are pivotally connected to said bars at one end and at their opposite ends to a block 28 that is adapted to slide between guides 29 on the frame. A rod 30 is attached to said block at one end and at the other end to an operating lever 31 mounted on one of the standards 16 within reach of the attendant on the machine. By moving this lever back and forth from its quadrant the block 28 will be operated and through the toggle links to force the drums out into engagement with the clutches on the carrying wheels or withdraw them. These drums operate continuously when the machine is in motion, assuming that they are in operative position and the cables will be wound thereon to lift the fork and its load.

A bail 32 is attached to the cross bar 21 and extends up over the head 17 of the fork and is pivotally connected to a rod 33. The rear end of the rod has a chain 34 attached thereto that is adapted to be wrapped around a shaft 35 journaled in the standard 16. This shaft has a suitable operating wheel 36 and a ratchet mechanism 37 by means of which the tilting of the fork may be controlled. The upright standards are connected with the standards 16 at the rear of the machine by braces 38. A receptacle 39 is mounted on the rear of the machine in which suitable material may be placed for weighting that end of the machine to counterbalance the load on the fork.

In the operation of the machine the hay or other material to be stacked is raked on to the fork or gathered up by means of poles and deposited thereon. When the fork is full the drums are thrown into mesh with the carrying wheels, the machine is started and the fork raised to the position indicated by dotted lines in Fig. 2. When the stack is reached the machine is driven up so that the fork overhangs the stack and the attendant then slackens the chain 34 to allow the fork to tilt down sufficiently to rest upon the stack. The team is then swung around to the rear of the evener and the machine pulled away leaving the hay on the stack.

I claim as my invention:

1. A machine of the class described, comprising a forward axle and carrying wheels therefor, a frame supported at its forward end on said axle, means supporting the rear end of said frame, standards mounted on said axle, there being one at each end thereof and two near the center, said center standards being comparatively near together, and a cross bar connecting all of said standards at the top, a beam pivotally supported at its rear end above said frame and adapted to slide vertically at its forward end between said middle standards, a fork mounted on the forward end of said beam, cables attached to said fork on each side of the center thereof, and passing over pulleys on each side of the center of said cross bar at the top of said standards and winding drums mounted on said axle and connected with said cables and means for rendering said drums operative or inoperative, substantially as described.

2. A machine of the class described, comprising a forward axle and carrying wheels therefor, a frame supported at its forward end on said axle, means supporting the rear end of said frame, standards mounted on said axle, there being one at each end thereof and two near the center, said center standards being comparatively near together, a cross bar connecting all the said standards, a beam pivotally supported at its rear end and adapted to slide vertically at its forward end between said center standards, a fork carried by the forward end of said beam, cables attached to said fork on each side of the center thereof and passing over pulleys on said cross bar, and winding drums mounted on the ends of said axle and connected with said cables, a clutch mechanism for rendering said winding drums operative or inoperative, and means for controlling said clutch mechanism.

3. A machine of the class described, comprising an axle, and carrying wheels therefor, a frame supported at its forward end on said axle and extending rearwardly therefrom, a platform mounted on the rear end of said frame, a swiveled guiding wheel supporting the rear of said frame and said platform, standards mounted on said frame in front of said platform, a beam pivoted at its rear end to said standards and above said frame and projecting forwardly therefrom over said axle, a fork pivotally supported on the forward end of said beam, a drum mounted between said platform standards and having a cable connection with said fork, standards mounted on said axle there being one at each end thereof and two near the middle and a cross bar connecting all the said standards at the top, said beam being vertically slidable between said middle standards, cables attached to said fork on each side of the center thereof and passing over the pulleys provided on said cross bar and drums mounted on each end of said shaft and connecting with said fork cables, and means for rendering said drums operative or inoperative, substantially as described.

In witness whereof, I have hereunto set my hand this 23rd day of December 1907.

C. W. DAVIS.

Witnesses:
H. A. JOHNSON,
O. P. OLSON.